United States Patent Office 2,733,325
Patented Jan. 31, 1956

2,733,325
ELECTROCONDUCTIVE ARTICLE

Samuel Frank Cox, Arnold, Pa., assignor to Pittsburgh Plate Glass Company, Allegheny County, Pa., a corporation of Pennsylvania No Drawing. Application March 22, 1951,
Serial No. 217,080

4 Claims. (Cl. 201—73)

This invention relates to improved ceramic or refractory bodies, particularly to transparent ceramic or refractory articles such as windshields or other similar structures, having electroconductive transparent coatings deposited thereon.

It is known that transparent electroconductive films may be deposited upon glass by applying stannic chloride to the surface of glass heated above 400° F., preferably 850 to 1350° F. Films of superior conductivity may be produced according to methods described in applications for United States Letters Patent, Serial No. 762,658, now Patent No. 2,614,944, and Serial No. 762,659, now Patent No. 2,648,754, both filed July 22, 1947, by William O. Lytle. These films or coatings are obtained by spraying plate, window or other glass, while it is heated to a temperature of above 400° F., but below the temperature at which the glass becomes molten, with tin tetrachloride or other tin salts in aqueous solution or in vapor state, in the presence of a reducing agent such as methanol, phenyl hydrazone hydrochloride, or other agents. The films thus obtained are of unknown composition, but appear to contain a preponderant amount, of the order of 97 to 99%, of a tin oxide and certain impurities which may include metallic tin, carbon, silicon, sodium and chlorine and other impurities, depending upon the composition of the applied tin containing solution. These films have a thickness of about 50 to 80 millimicrons, are transparent and have the unusual characteristic of being electroconductive, the particular degree of electroconductivity being dependent, to a large degree, upon the nature of the process of depositing the films. Tin oxide films, which are deposited in accordance with the processes described and claimed in the aforesaid applications of William O. Lytle, incorporation of the disclosure of which is made a part hereof by reference, have a resistance below about 500 ohms per unit square, a specific resistance below about 0.002 ohm centimeters, and a coefficient of linear expansion of about 5 to 6×10$^{-6}$ per ° C. between 25 to 475° C. Further details respecting the production of these films will be supplied hereinafter.

Although articles having such films are useful in many fields, they have been found to be especially useful as windshields or viewing closures in automobiles, aircraft, trains and similar automotive vehicles. In such use the coating is placed in series with a source of electric potential and is used as a heating element in order to heat the closure and prevent deposition of ice, fog, etc., thereupon.

As disclosed in the Lytle applications, a glass sheet, usually of plate glass or other flat glass structure (including bent or curved glass structures), is provided with conducting metal strips suitable for bus bars. These strips are generally located adjacent the edges of the glass (usually within 0.5 inch of the edge) and, in the preferred embodiments, are located on opposed marginal edges. For example, in an essentially rectangular viewing closure such as a windshield, two bus bars are applied on a pair of opposite marginal edges. These metallized strips must be capable of withstanding the temperatures and oxidizing conditions of treatment and, therefore, preferably should be of a ceramic character. Furthermore, they should be capable of glazing or otherwise forming an adherent, well-bonded coating to the glass. The strips should adhere firmly to the glass sheet, and should have a conductivity at least 10 to 20 times that of the conductive coating. Generally, the strips are from about 0.1 to 1 inch in width. In practice, it has been found that the most satisfactory compositions, for use in preparing the bus bars, comprise a highly conductive metal powder (preferably gold or silver), and a vitrifying binder.

In order to avoid production of bus bars which will develop, in use, excessive stresses in the glass, the bus bar preferably should be located on the extreme edge of the glass and the bus bar thickness should not exceed about 0.005 inch and, preferably, should be below about 0.003 inch.

After application of the metal bus bars to the glass sheet by painting or other method, the sheet is heated to the temperature at which application of the conductive coating may be effected, for example, above about 400 to 800° F. but below the fusion point of the glass, usually 950 to 1150° F. During this heating operation, the ceramic metal coating becomes glazed and is baked onto the glass so that a firm bond is established between the glass and the metal coating.

When the glass has been heated as above described, for one or two minutes, it is withdrawn from the heating chamber and immediately is sprayed with the coating solution before substantial cooling of the glass sheet can take place. A quantity of the coating solution is placed in an atomizing spray gun and the heated glass sheet is sprayed with an atomized spray of this material for a brief period, usually of the order of 2 to 20 seconds, depending upon the thickness of film to be produced, the air pressure imposed upon the atomizing spray gun, etc. This process results in the production of a base coated with a tin oxide electroconductive film.

Articles produced according to the above description, further details of which will be supplied below, are suitable for use as viewing closures or windows. Usually they are laminated with a suitable plastic such as polyvinyl butyral to reinforce the glass and provide a so called "safety glass" construction. These closures may be successfully heated by imposing an electric potential across the bus bars, thus using the conductive film as a resistance element.

In the past an unduly high number of windshields or like panels of the type herein described have failed in use or test. This failure frequently is manifested by peeling of the electroconductive film from the base after an electric potential has been imposed across the bus bars to cause the film to be heated, for example, to 100 to 125° F. or above for a period of time.

In accordance with this invention, it has been found that one of the causes of such failure is unequal expansion of the base and film upon heating. For example, tin oxide films having a coefficient of linear expansion of 5 to 6×10$^{-6}$ per °C. between the temperature range of 25–575° C. when deposited by the methods described above on a lime-soda glass base having a coefficient of linear expansion of about 10.5×10$^{-6}$ per °C. between 25–500° C. exhibit failure by peeling when heated to temperatures of 100 to 125° F. or above for a period of time. When such base and film are so heated, there results high shear stresses at the interface between the base and film and consequent failure of the panel due to peeling of the film from the base. The coefficient of linear expansion of the tin oxide films contemplated in the practice of the invention varies from about 5 to 6×10$^{-6}$ per °C. depending upon the ingredients of the spraying solution employed.

It has been found that substantial reduction in failures due to peeling may be effected by use of a base and film which have substantially the same coefficient of linear expansion. It is desirable that the coefficient of linear expansion of the base should not differ more than plus or minus 30 percent from the coefficient of linear expansion of the film, preferably within 10 percent.

*Example*

A typical example of an electroconductive panel embodying the invention is a tin oxide film having a coefficient of linear expansion of $5.8 \times 10^{-6}$ per °C. between the temperature range of 25–575° C. deposited as described above on a plate glass having a coefficient of linear expansion of $5.89 \times 10^{-6}$ per °C. between the temperature range of 25–500° C. Such a glass has the following chemical analysis:

| | Percent by weight |
|---|---|
| $SiO_2$ | 61.3 |
| $B_2O_3$ | 13.3 |
| $Na_2O$ | 9.4 |
| $Cl_2$ | 0.4 |
| $ZnO$ | 12.5 |
| $SO_3$ | 0.4 |
| $As_2O_5$ | 0.5 |
| $Al_2O_3$ | 2.2 |
| | 100.0 |

Polished plates 6" x 6" x 3/16" made from a glass of the above chemical analysis were heated in a furnace until the temperature of the furnace was indicated to be about 1250° F. and then heated at that temperature for a period of time up to 60 seconds. The heated plates were removed from the furnace and immediately sprayed with a stannic chloride solution composed of the following ingredients:

| | |
|---|---|
| Stannic chloride | grams_ 20,430 |
| Phenyl hydrazine hydrochloride | do_ 639 |
| An aqueous solution of hydrofluoric acid containing about 48 percent by weight of hydrofluoric acid | grams_ 134 |
| Distilled water | milliliters_ 7,056 |
| Dioctyl sodium sulfo-succinate solution | do_ 918 |
| Methanol | do_ 2,250 |

The spray gun was operated at an air pressure of 50 pounds per square inch and varying quantities, from 5 to 50 cubic centimeters, were sprayed on the plates in order to check the adherence of films of different thicknesses. The adhesion of the tin oxide films to this glass base is excellent and the film exhibits no tendency to peel even when film thickness of as high as 1500 millimicrons are applied to the base.

The invention is particularly applicable for use in connection with transparent tin oxide films. However, the invention is also applicable in connection with other transparent electroconductive films, particularly metal oxide films, wherein the coefficient of linear expansion of the film is substantially the same as that of the refractory base upon which it is deposited. Thus the films herein contemplated may comprise cadmium oxide, antimony oxide, cobalt oxide, zinc oxide, indium oxide, titanium oxide, chromium oxide, platinum oxide, silicon oxide, silver oxide, thallium oxide, etc. which may be prepared using bromide, chloride or acetate of the corresponding metal.

Where viewing closures for vehicles are to be provided, the base for the film normally is ordinary window or lime soda glass. Other refractory materials including borosilicate glass, china, mica, phosphate glass, silicon carbide, tungsten carbide, porcelain, stone or other refractory composition which melts at temperatures about 1150 to 1350° F. may be provided with electroconductive coatings in the same manner.

Although the present invention has been described with reference to the specific details of certain embodiments thereof, it is not intended that such details shall be regarded as limitations upon the scope of the invention except insofar as included in the accompanying claims.

I claim:

1. A transparent article of manufacture which comprises a transparent glass base having thereon a transparent electroconductive tin oxide film having a coefficient of linear expansion of from 5 to $6 \times 10^{-6}$ per °C., said glass base having a coefficient of linear expansion which does not differ from the coefficient of linear expansion of the film by more than 30 percent.

2. An article of manufacture which comprises a glass base having thereon a transparent electroconductive tin oxide film, said glass base having an analysis substantially as follows:

| | Percent by weight |
|---|---|
| $SiO_2$ | 61.3 |
| $B_2O_3$ | 13.3 |
| $Na_2O$ | 9.4 |
| $Cl_2$ | 0.4 |
| $ZnO$ | 12.5 |
| $SO_3$ | 0.4 |
| $As_2O_5$ | 0.5 |
| $Al_2O_3$ | 2.2 |
| | 100.0 |

3. A glass composition having an analysis substantially as follows:

| | Percent by weight |
|---|---|
| $SiO_2$ | 61.3 |
| $B_2O_3$ | 13.3 |
| $Na_2O$ | 9.4 |
| $Cl_2$ | 0.4 |
| $ZnO$ | 12.5 |
| $SO_3$ | 0.4 |
| $As_2O_5$ | 0.5 |
| $Al_2O_3$ | 2.2 |
| | 100.0 |

4. A transparent article of manufacture which comprises a transparent glass base having thereon a transparent electroconductive tin oxide film having a coefficient of linear expansion of from 5 to $6 \times 10^{-6}$ per °C., said base having substantially the same coefficient of expansion as said film.

References Cited in the file of this patent

UNITED STATES PATENTS

| | | |
|---|---|---|
| 1,971,837 | Ulrey | Aug. 28, 1934 |
| 2,194,611 | Paddock et al. | Mar. 26, 1940 |
| 2,357,550 | Rowland | Sept. 5, 1944 |
| 2,429,420 | McMaster | Oct. 21, 1947 |
| 2,429,432 | Stanworth | Oct. 21, 1947 |
| 2,570,245 | Junge | Oct. 9, 1951 |

FOREIGN PATENTS

| | | |
|---|---|---|
| 539,957 | Great Britain | Sept. 30, 1941 |
| 925,028 | France | Mar. 17, 1947 |

OTHER REFERENCES

Knapp: "Alkali-Free Glasses," The Glass Industry, March 1940, pages 115–6.